May 27, 1958

E. A. MEYER 2,836,458

RETAINING MEANS FOR DOOR TRIM PANEL

Filed Sept. 14, 1955

INVENTOR.
Engelbert A. Meyer
BY
Paul Fitzpatrick
ATTORNEY

United States Patent Office 2,836,458
Patented May 27, 1958

2,836,458

RETAINING MEANS FOR DOOR TRIM PANEL

Engelbert A. Meyer, Detroit, Mich., assignor to General Motors Corporation, Detroit, Mich., a corporation of Delaware Application September 14, 1955, Serial No. 534,238

4 Claims. (Cl. 296—44)

This invention relates to vehicle door construction, and more particularly to means for retaining a trim panel on an automobile door.

One feature of the invention is that it provides an improved automobile door construction; another feature of the invention is that it provides an improved means for retaining a trim panel on an automobile door; a further feature of the invention is that the trim panel is held on a trim support member underlying the garnish molding trim strip and is not directly retained by the garnish molding trim strip; still another feature of the invention is that the trim support member has a trough and a U-shaped trim retainer clamps the edge of the trim panel in the trough to provide a wrinkle-free construction.

Figure 1:
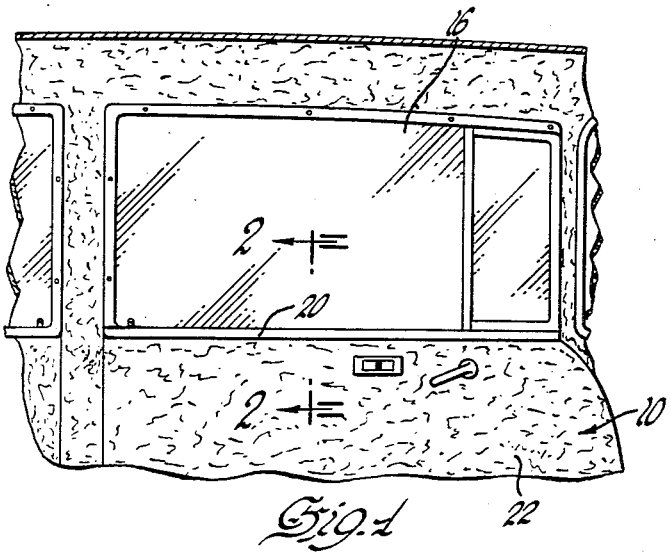
Figure 2:
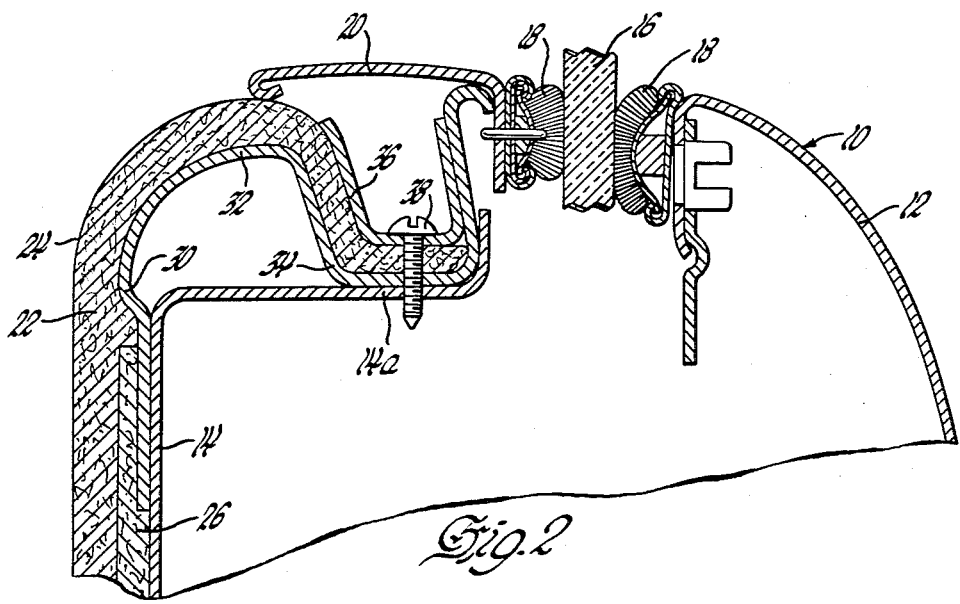

Other features and advantages of the invention will be apparent from the following description and from the drawings, in which:

Fig. 1 is a fragmentary inside elevation showing a door having a trim panel mounted thereon in accordance with the invention; and Fig. 2 is an enlarged transverse vertical section through the door taken along the line 2—2 of Fig. 1.

In conventional automobile door construction, the trim panel on the inside surface of the door is clamped directly against the inner door panel by the garnish molding trim strip. This does not provide a uniformly tight clamping action and often resulted in wrinkles at the top of the trim panel. In the improved trim panel retaining means disclosed and claimed herein, the trim panel extends underneath the edge of the garnish molding trim strip and is clamped by a U-shaped trim retainer in a trough in a trim support member. Since the clamped edge of the trim panel underlies the garnish molding trim strip but is not clamped directly, thereby a smooth wrinkle-free construction at the edge of the garnish molding strip results.

Referring now more particularly to the drawings, 10 represents an automobile door having an outer panel 12 and an inner panel 14. A window 16 is movable vertically into the door between the inner and outer panels, being engaged at its inner and outer surfaces by conventional Bailey sealing strips 18. A garnish molding trim strip 20 extends along the lower surface of the window opening. In the past, it has been conventional to clamp the trim panel 22 which forms the inner surface of the door directly between the garnish molding trim strip and the inner door panel. This often resulted in a wrinkled construction, particularly immediately adjacent the edge of the garnish molding trim strip.

The trim panel 22 comprises a body portion which preferably has a decorative surface 24 formed of artificial leather or the like. A cardboard backing member 26 gives rigidity to the trim panel, but, as shown in Fig. 2, this cardboard backing terminates below the upper edge of the trim panel to permit the body portion of the trim panel to be bent to conform to the shape of the trim retaining means.

In the improved construction, the trim panel is not clamped directly between the garnish molding trim strip 20 and the inner door panel 14, and is not held at all by the garnish molding strip. A trim support strip member 30 is welded or secured in any other manner to the upper portion of the inner door panel. This trim support member is formed with a vertical portion for securing the trim support strip to the inner door panel and with a generally horizontal portion formed with an upwardly bent ridge 32 and a trough 34 adjacent and immediately outwardly of the ridge. The trim panel is bent over the upstanding ridge 32 so that the edge of the trim panel overlies the trough, and a U-shaped clamping strip 36 is mounted in the trough by screws 38 to clamp the edge of the trim panel between the U-shaped member 36 in the trough of the trim support member. The screws 38 extend through the flanged edge portion 14a of the door inner panel 14 to provide a firm assembly. Since the trim panel is not clamped directly by the garnish molding strip but is clamped along a line underlying an intermediate portion of the garnish molding strip, a wrinkle-free condition is attained along the line of contact between the edge of the garnish molding strip 20 and the trim panel 22.

While I have shown and described one embodiment of my invention, it is capable of many modifications. Changes, therefore, in the construction and arrangement may be made without departing from the spirit and scope of the invention as set forth in the appended claims.

I claim:

1. In combination in an automobile door construction, a vertically disposed door panel having a longitudinally extending upper edge portion; a trim support member having a vertical portion secured to the upper vertical part of said panel and a generally horizontal portion with a trough formed therein above the horizontal portion of said door panel; a trim panel having its edge overlying said trough; a U-shaped trim retainer for clamping the edge of said trim panel in the trough; fastening means clamping the retainer, the trim panel, the support member and the horizontal portion of the door panel together; and a garnish molding strip overlying the trim retainer.

2. In combination in an automobile door construction, a vertically disposed door panel having a horizontally extending upper edge portion; a trim support member having a vertical portion secured to the upper vertical part of said panel and a generally horizontal portion with an upwardly bent ridge and a trough adjacent said ridge above the horizontal portion of said door panel; a trim panel bent over said ridge and having its edge overlying said trough; a U-shaped trim retainer for clamping the edge of said trim panel in the trough; and fastening means extending through the retainer, the trim panel, the support member and the horizontal portion of the door panel and clamping said parts together.

3. In combination in an automobile door construction, a vertically disposed door panel having a horizontally extending upper edge portion; a trim support member having a vertical portion secured to the upper vertical part of said panel and a generally horizontal portion with an upwardly bent ridge and a trough adjacent said ridge above the horizontal portion of said door panel; a trim panel bent over said ridge and having its edge overlying said trough; a U-shaped trim retainer for clamping the edge of said trim panel in the trough; fastening means extending through the retainer, the trim panel, the support member and the horizontal portion of the door panel and clamping said parts together; and a garnish molding strip overlying the trim retainer.

4. In combination in an automobile door construction, a vertically disposed inner door panel, a trim support member having a vertical portion secured to the upper vertical part of said panel and a generally horizontal portion projecting over the upper edge of said panel and having a trough formed therein, a trim panel lying along said door panel and support member and having its edge lying in said trough, a U-shaped retainer for clamping the edge of the trim panel in the trough, fastening means clamping the retainer, the trim panel and the support member together, and a garnish molding strip overlying the trim retainer and having its edge engaging the trim panel in the area of said horizontal portion.

References Cited in the file of this patent

UNITED STATES PATENTS

| | | |
|---|---|---|
| 1,507,810 | Brandt | Sept. 9, 1924 |
| 1,531,838 | Bonel | Mar. 31, 1925 |
| 1,688,867 | Heinz | Oct. 23, 1928 |
| 2,160,637 | Ball | May 30, 1939 |